(12) United States Patent
Horn et al.

(10) Patent No.: US 9,587,413 B2
(45) Date of Patent: Mar. 7, 2017

(54) APPARATUS AND METHOD FOR PROCESSING A CONCRETE TOWER SEGMENT OF A WIND TURBINE

(71) Applicant: Wobben Properties GmbH, Aurich (DE)

(72) Inventors: Gunther Horn, Aurich (DE); Norbert Holscher, Aurich (DE); Olaf Stracke, Emden (DE)

(73) Assignee: WOBBEN PROPERTIES GmbH, Aurich (DE)

( * ) Notice: Subject to any disclaimer, the term of this patent is extended or adjusted under 35 U.S.C. 154(b) by 1 day.

(21) Appl. No.: 14/360,215

(22) PCT Filed: Nov. 21, 2012

(86) PCT No.: PCT/EP2012/073274
§ 371 (c)(1),
(2) Date: May 22, 2014

(87) PCT Pub. No.: WO2013/076166
PCT Pub. Date: May 30, 2013

(65) Prior Publication Data
US 2014/0283478 A1    Sep. 25, 2014

(30) Foreign Application Priority Data

Nov. 24, 2011 (DE) .......... 10 2011 087 025
Oct. 17, 2012 (DE) .......... 10 2012 020 333

(51) Int. Cl.
*E04H 12/34* (2006.01)
*B24B 27/00* (2006.01)
(Continued)

(52) U.S. Cl.
CPC ......... *E04H 12/341* (2013.01); *B23Q 9/0042* (2013.01); *B24B 7/186* (2013.01);
(Continued)

(58) Field of Classification Search
CPC .................................................. E04H 12/341
(Continued)

(56) References Cited

U.S. PATENT DOCUMENTS 3,510,098 A * 5/1970 Fox .............. E04G 11/065
249/1
5,533,790 A    7/1996 Weiland
(Continued)

FOREIGN PATENT DOCUMENTS

DE    101 08 139 A1    8/2002
DE      10240708 A1    2/2004
(Continued)

OTHER PUBLICATIONS

Akinci et al, A formalism for utilization of sensor systems and integrated project models for active construction quality control, 2006, Automation in Construction, vol. 15, iss. 2, 124-138.*
(Continued)

*Primary Examiner* — Timothy Kennedy
(74) *Attorney, Agent, or Firm* — Seed Intellectual Property Law Group LLP (57) ABSTRACT

The invention concerns a processing apparatus for processing an upper segment edge of a pylon segment of a concrete pylon for preparing the pylon segment for placement thereon of at least one further pylon segment. According to the invention it is proposed that the processing apparatus includes a processing means for processing the segment edge, and a carrier apparatus to be fixed in the region of the segment edge for displaceably carrying and guiding the processing means along the segment edge.

19 Claims, 8 Drawing Sheets (51) Int. Cl.
*B28D 1/18* (2006.01)
*B28B 11/12* (2006.01)
*B24B 7/22* (2006.01)
*B28D 1/20* (2006.01)
*B23Q 9/00* (2006.01)
*B24B 7/18* (2006.01)
*E04G 11/20* (2006.01)
*E04H 12/00* (2006.01)
*E04H 12/12* (2006.01)

(52) U.S. Cl.
CPC ............ *B24B 7/22* (2013.01); *B24B 27/0007* (2013.01); *B28B 11/12* (2013.01); *B28D 1/18* (2013.01); *B28D 1/20* (2013.01); *E04G 11/20* (2013.01); *E04H 12/00* (2013.01); *E04H 12/12* (2013.01); *E04H 12/342* (2013.01); *B23Q 2210/006* (2013.01)

(58) Field of Classification Search
USPC ............................ 425/63; 264/31, 32, 33, 34
See application file for complete search history.

(56) References Cited

U.S. PATENT DOCUMENTS

| | | |
|---|---|---|
| 8,597,564 B2 | 12/2013 | Holscher |
| 2004/0134275 A1 | 7/2004 | Reichel et al. |
| 2011/0107708 A1* | 5/2011 | Holscher ................ B28B 1/008 52/651.01 |
| 2012/0260591 A1 | 10/2012 | Holscher et al. |

FOREIGN PATENT DOCUMENTS

| | | |
|---|---|---|
| DE | 10 2008 016 828 A1 | 10/2009 |
| DE | 10 2009 049 435 A1 | 4/2011 |
| JP | 49-52191 U | 5/1974 |
| JP | 2006-118245 A | 5/2006 |
| TW | 201135036 A1 | 10/2011 |
| UA | 57197 U | 2/2011 |

OTHER PUBLICATIONS

Concrete Grinding Ltd: 11 Concrete Grinding Jun. 10, 2011 (Jun. 10, 2011), Seiten 1-1 XP054975128, Gefunden im Internet: URL:http://www.youtube.com/watch?v=YZ4auji R7qU.

* cited by examiner

APPARATUS AND METHOD FOR PROCESSING A CONCRETE TOWER SEGMENT OF A WIND TURBINE

BACKGROUND

Technical Field

The present invention concerns an apparatus for processing an upper segment edge of a pylon segment of a concrete pylon, in particular of a wind power installation, and a corresponding processing means. The invention further concerns a corresponding method. In addition the invention concerns a concrete pylon segment in the form of a precast concrete member. The invention further concerns a concrete pylon made up from pylon segments, in particular of a wind power installation. In addition the invention concerns a wind power installation and a method of manufacturing a pylon of a wind power installation.

Description of the Related Art

Figure 1:
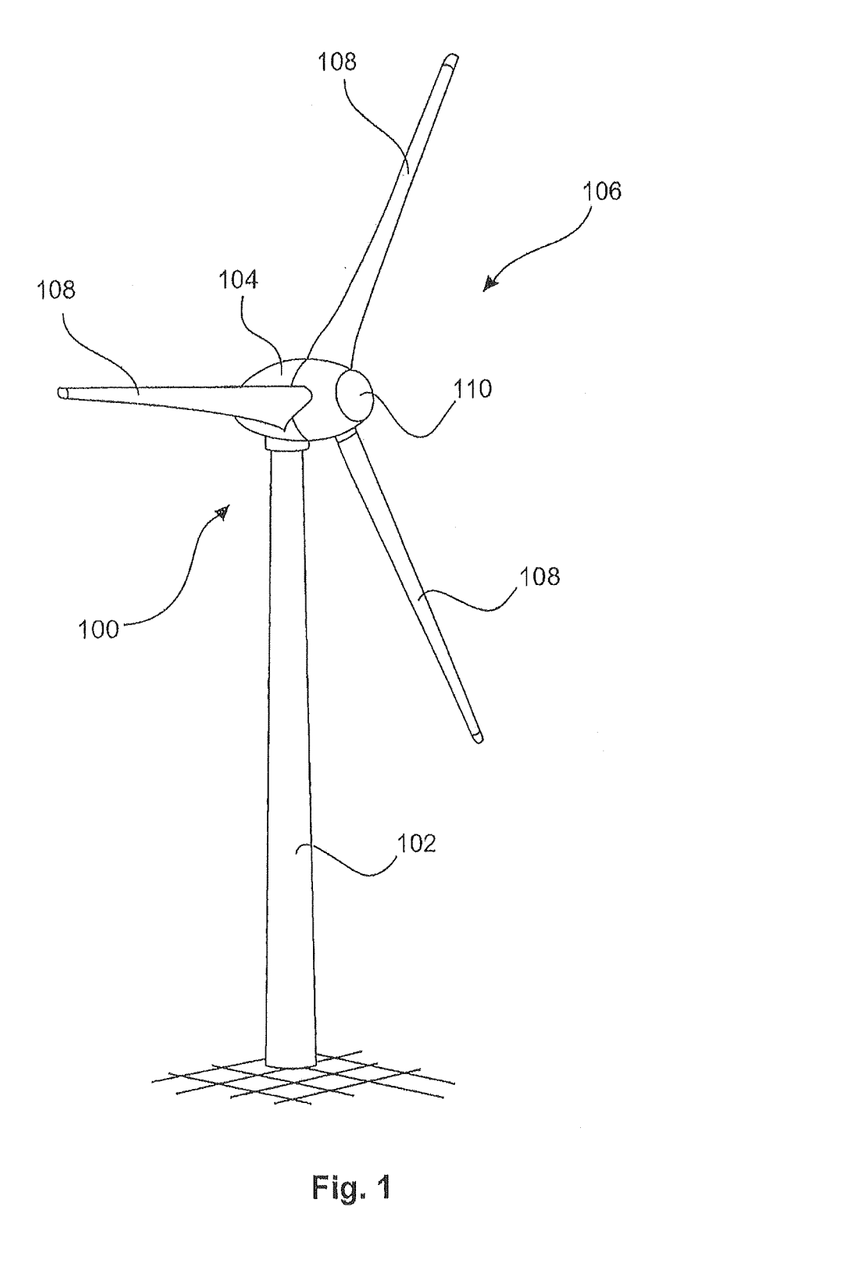
FIG. 1 shows a diagrammatic perspective view of a typical wind power installation having a concrete pylon constructed from pylon segments which are according to the invention or which were produced according to the invention.

Modern wind power installations like the one shown for example in FIG. 1 have a pylon, on which a wind power installation pod is rotatably mounted. Such a pylon nowadays reaches heights of 130 m and in the future even higher pylons are likely to be encountered. One mode of construction for such a wind power installation pylon is the use of pylon segments in the form of precast concrete members which are placed one upon the other in the manner of a building block system in order thereby to entirely or partially form the pylon.

If therefore a pylon is made up from many superposed pylon segments it is essential that the planes on which pylon segments are respectively placed one upon the other extend in mutually plane-parallel relationship so that the pylon stands up straight and perpendicularly. Accordingly each segment should have a top side and an underside which are arranged in mutually plane-parallel relationship.

For that purpose German laid-open application DE 10 2008 016 828 A1 discloses a method of manufacturing precast concrete members in which post-processing of a cast precast concrete component is effected after hardening in such a way that a compensating layer is applied to a contact surface opposite to an underside. The compensating layer can have for example a synthetic resin or cement. The precast concrete member prepared in that way is then placed on a horizontal plane and the compensating layer is removed in plane-parallel relationship with that horizontal plane. An apparatus similar to a portal milling machine is used for that purpose. Such a milling machine must be suitably oriented precisely relative to the horizontal plane and must operate appropriately accurately to achieve an appropriate quality in respect of the plane-parallelism to be achieved. Overall that method is really complicated and expensive.

German laid-open application DE 10 2009 049 435 A1 discloses an improved method of applying a compensating layer to an upper edge of a precast concrete member. In that case a cover member is applied to the shuttering in which the precast concrete member was cast and substantially hardened, the cover member providing above the concrete segment an annular passage into which a compensating material of low viscosity is introduced.

A disadvantage of the method disclosed in DE 10 2009 049 435 A1 is that a cover member has to be provided for each shuttering segment of a precast concrete member.

BRIEF SUMMARY

One or more embodiments of the invention seek to improve a method of achieving plane-parallelism of the top side and the underside of a concrete pylon segment, in particular simplifying it with the quality remaining high. One embodiment of the invention is to produce a plane-parallel join on a precast concrete member. The production process is implemented with as few production means as possible. In addition or alternatively one embodiment is to provide a processing apparatus which is also to be used for the area of foundation processing.

According to one embodiment there is proposed an apparatus according to claim 1. That apparatus is used for processing an upper segment edge of a pylon segment of a concrete pylon to be produced. That processing operation is effected for preparing the pylon segment for the placement thereon of at least one further pylon segment. In particular the processing operation produces plane-parallelism, namely between a plane in which the upper segment edge extends and a plane in which a lower segment edge extends. The base support surface of the pylon segment is thus in the lower plane.

The upper segment edge is thus the upper contact surface which is initially still to be processed, namely an annularly peripherally extending contact surface. That contact surface and thus the upper segment edge is flat and in that respect is to be provided in plane-parallel relationship with the support base surface. The processing apparatus is intended to at least partially perform that task.

In addition there is provided a processing means for processing the segment edge and a carrier apparatus to be fixed in the region of the segment edge for displaceably carrying and guiding the processing means along the segment edge. The processing means thus performs at least one processing step and in that case moves along the segment edge. Basically in that respect the processing means performs an in particular slow circular or part-circular movement, which can be achieved for example by using a carriage on a rail system. For that purpose the processing means is carried and guided by the carrier apparatus. In particular in that case the processing means is carried substantially above the upper segment edge and is guided along a circular or part-circular path.

Preferably there is provided a measuring means for determining the position of the processing means in relation to a processing plane in plane-parallel relationship with the support base surface. Accordingly the measuring means is provided basically for determining a horizontal position of the processing means. In that case that horizontal position is related to the support base surface or another processing plane in plane-parallel relationship therewith. That permits position monitoring of the processing means relative to the processing plane. In that way the position, namely in particular the height of the processing means, can be monitored, and it is optionally also possible to implement regulating intervention.

According to an embodiment it is proposed that the measuring means is a position sensor for measuring and transmitting the position of the processing means and/or for predetermining a virtual measuring plane and that there is provided at least one orienting means for orienting the position sensor in relation to the support base surface. The position sensor thus measures the position of the processing means in relation to the support base surface, namely basically the precise height of the processing means in relation to the support base surface. The position sensor thus measures in particular or exclusively that height of the processing means. Accordingly the position sensor detects that position, in particular the height of the processing means, and transmits that information to the processing means which can react thereto, if required. Alternatively or additionally the position sensor transmits a signal which the processing means uses in order thereby itself to determine its position.

In that respect it is desirable that the position of the position sensor, namely in particular its position in relation to the support base surface, is very accurately known. That includes the precise spacing of the position sensor relative to the support base surface and also its orientation in relation to the plane of that surface. In that case the position sensor is so oriented that it basically establishes or defines a virtual plane which is in plane-parallel relationship with the support base surface and which can also be referred to as the virtual measuring plane. The position of the processing means can thereby be related to that virtual measuring plane. In particular the processing means or a reference point of the processing means extends in optimum fashion in that virtual measuring plane. Deviations from that virtual measuring plane are detected by the position sensor and transmitted to the processing means. In that way the position of the processing means can be precisely detected and possibly taken into account. In that way slight variations in height, in particular caused by variations in the carrier apparatus in relation to the support base surface or in relation to the virtual measuring plane can be taken into account and compensated in the optimum fashion.

For orientation of the position sensor itself, namely in relation to the support base surface, the use of at least one orientation means is proposed. The orientation means is preferably also disposed at least approximately in the virtual measuring plane in order thereby to implement height and orientation in relation to the virtual measuring plane or to make same available for that purpose as a reference object for the position sensor. Preferably four orientation means are used, which are arranged approximately in the virtual measuring plane. In that way three orientation means are available to check orientation and height of the position sensor or to serve as a reference point for the position sensor in regard to its orientation. When using four orientation means therefore three are available for orientation and a fourth can provide for redundancy.

Preferably the measuring means is in the form of a laser measuring device. In that way the virtual measuring plane which is in plane-parallel relationship with the support base surface is defined in particular by means of the laser. On the basis of that virtual measuring plane, the position of the processing means is determined relative thereto. Thus a laser is projected from the position sensor to a suitable location on the processing means and thereby the height of the processing means, in particular the reference mark, relative to the laser projection, is determined and detected thereby, in particular relative to a reference mark on the processing means. The position sensor can provide for tracking of the laser in the movement of the processing means in the virtual measuring plane.

Orientation of the position sensor can also be implemented or checked in a similar fashion, more specifically insofar as the position sensor also projects a respective laser on to each of the processing means and there orients itself or is oriented in such a way that a projection is projected on to a respective predetermined position mark of each orientation means. Thus the position sensor and in particular each orientation means can be fixedly installed in respect of its height relative to the support base surface. The orientation means provides in particular for a parallel positioning of the position sensor, at least of the laser emitted to the processing means. The use of three orientation means thus makes it possible to check for plane-parallelism or the position sensor can be correspondingly oriented.

The laser measuring means can also be of such a design configuration that the position sensor projects a laser in a plane, namely the virtual measuring plane, on to the processing means, and the processing means has a sensor which recognizes the position of the projected laser in respect of height and thereby detects the position of the processing means relative to the support base surface or relative to the virtual measuring plane. The laser projected for that purpose on to the processing means can be caused to track along with the processing means in its movement along the carrier apparatus, or a laser is continuously emitted in very many directions on a short-term basis in order thereby to provide that a laser is also projected regularly from the position sensor on to the processing means. In that case the same laser which is continuously discharged in different directions in the virtual measuring plane can also lead to position detection at the orientation means. The term emission of a laser continuously in many directions is used in particular also to mean pulse-like emission in many directions, in particular in succession. The laser is set up in particular centrally and emits in 360°. Continuous emission in different directions does not necessarily mean in that respect that emission is to be effected permanently as a continuous-duty laser.

In a further embodiment it is proposed that the carrier apparatus is in the form of a rail system, and in particular that the carrier apparatus has a pair of rails. It is desirable if the rail system or the pair of rails is fixed to a shuttering for production of the pylon segment, in particular being permanently fixedly secured thereto. Such a shuttering usually requires an inner and an outer shuttering in order to receive therebetween a corresponding wall of the pylon segment or to receive therebetween the concrete which is to be poured thereinto to produce that wall. It is thus desirable for a rail to be fixedly installed to the inner shuttering and a rail to be fixedly installed to the outer shuttering. The carrier apparatus is thus also automatically provided by the provision of the shuttering. A necessary degree of accuracy when processing the segment edge—after pouring and hardening of the pylon segment—can be achieved or monitored by means of the measuring means. A high degree of production accuracy in respect of the carrier apparatus can become unnecessary as a result of that.

In a further embodiment it is proposed that the processing means is in the form of a displaceable means, in particular an application tool, for applying a compensating material, in particular a resin or cement application, and/or the processing means or a further processing means is in the form of a material-removing apparatus, in particular in the form of a milling apparatus and/or in the form of a grinding apparatus. A compensating material is provided for compensating for any differences in height and for that purpose it can be in the form of a resin, in particular synthetic resin, or cement. In subsequent references to resin they basically also concern other compensating materials, in particular cement, unless otherwise stated. The processing means is thus either in the form of a resin or cement application or in the form of a material-removing apparatus. The processing apparatus can also have a plurality of processing means of which one is in the form of a resin or cement application means and the other is in the form of a material-removing apparatus.

It is correspondingly provided that in this embodiment of the use of two processing means, both are adapted in particular to the rail system and both can be displaced—in particular in succession—on that rail system or carrier apparatus of another configuration. The interplay with the measuring means can also be provided for both processing means. Possibly however a lesser degree of accuracy is required for the resin or cement application means. Accordingly, co-operation of the resin or cement application means with the measuring means is possibly not involved or involves a lesser degree of accuracy. In particular an application of a resin or cement with the resin or cement application process can involve a low degree of accuracy and smoothing, in particular milling or grinding with a material-removing processing device, can involve a higher degree of accuracy, whereby inaccuracies in application of the material are compensated again. Nonetheless, application which is as accurate as possible is also desirable in order to have to remove as little as possible from the applied application material, for the purposes of smoothing or levelling off.

A resin surface, cement surface or other compensating surface which in that way is produced, applied and levelled off, provides a surface which is in plane-parallel relationship with the support base surface, for the pylon segment, for placement of a further pylon segment thereon.

Preferably the processing means has a working head which is movable in height and which in particular is removable. That working head can be respectively adapted in height in accordance with the respectively detected position of the processing means in such a way that a body, guided by the carrier apparatus, of the processing means is admittedly changed in its vertical position—with respect to the virtual measuring plane or the support base surface—in particular a housing or a carrier frame, but the working head remains constant in that vertical position. It is possible in that way to compensate in particular for inaccuracies in the carrier apparatus, in particular of a corresponding rail system. That permits the provision of a carrier apparatus with a lower level of accuracy and thus in markedly less expensive fashion.

Preferably the carrier apparatus is adapted for fixing to a shuttering for production of the concrete segment or is already fixed to the shuttering. Preparation for the fixing can be such that the carrier apparatus is adapted in its shape to the shuttering. This can also mean that the carrier apparatus has at least one fixing means for fixing to the shuttering. Examples of fixing means include bolts, screws, clamps, nails with enlarged heads, and the like.

Additionally or alternatively the processing means has a travel apparatus for displacement along the carrier apparatus, which has in particular one or two rails and accordingly for displacement along the upper segment edge. The travel apparatus is adapted to receive a processing tool. The processing tool can be a tool for applying a compensating material, in particular a resin or cement. Equally the processing tool can be in the form of a material-removing tool, in particular for milling or grinding. In particular it is proposed that the travel apparatus is adapted to receive a suitable processing tool, depending on the respective working step to be performed. In that way, when different working steps are involved like application of the compensating material and the later flattening operation, namely the removal of compensating material, it is possible to use the same travel apparatus, in which case only the processing tool has to be changed.

In addition there is proposed a processing means suitable for processing or producing a planar surface, in particular an upper segment edge, and additionally or alternatively for processing a planar surface of a processing tray and/or a planar surface of a concrete foundation. All those processing tasks ultimately serve to prepare for the erection of a concrete pylon. Such a proposed processing means includes a processing tool, a carrier frame and a plurality of displacement means. The processing tool is provided for processing the planar surface, which also includes production of the planar surface. The processing tool is provided in particular for milling such a surface flat. Suitable processing heads, that is to say in the specified example corresponding milling heads, can be used for that purpose, being adapted to the material of the surface to be processed. The processing tool however can also be provided for applying a compensating material or another material layer and it can optionally be provided for post-processing such an applied compensation layer, in particular after the latter has hardened.

The carrier frame carries the processing tool and can be displaced by means of the displacement means in order thereby to displace the processing tool along the surface to be processed. In that case the displacement means are adapted for displacement along the planar surface and/or for displacement along carrier apparatuses arranged adjacent to the planar surface. The displacement means themselves are thus arranged in the region of the planar surface to be processed and also move there. For example each displacement means can include a wheel, a roller or a set of wheels. In that way each displacement means can be guided along a rail which substantially follows the planar surface to be processed. In particular it is possible for that purpose to provide a circular or two circular rails arranged in mutually concentric relationship.

The entire carrier frame is displaced by means of the displacement means, and therewith the processing tool carried by the carrier frame. Displacement of the processing tool is therefore effected substantially not by displacement of the processing tool relative to the carrier frame but together with the carrier frame. A relative movement of the processing tool or at least one processing head, in particular also in a vertical direction, can however be additionally provided.

Preferably the displacement means is adapted for displacement along a path of a circle. This provides for specific adaptation to the needs for processing a segment edge of a concrete pylon segment or a support base surface of such a segment. In that case, planar support base surfaces for a pylon segment are required both on a processing tray for production of the pylon segment and also on a foundation on which the concrete pylon is to be erected and on which a lower pylon segment stands. Contrary to a solution as appears to be known for example from DE 10 2008 016 828 A1, positioning of the processing means by presetting two Cartesian co-ordinates, so-called X-Y-co-ordinates, is dispensed with, and rather it is basically the case that the entire processing means is moved along the path of a circle, that is to say a circular path.

Preferably the carrier frame spans over the circle. Accordingly, at least two displacement means are arranged at approximately mutually opposite positions on the circle and are connected by way of the carrier frame. In particular four displacement means can be respectively arranged more specifically in twos at mutually opposite sides. An advantageous configuration proposes in that respect that the processing means in proper operation operates in such a way that the carrier frame rotates about an axis of rotation, more specifically while the displacement means respectively move along the circular path. That is advantageously such that the corresponding axis of rotation extends through the carrier frame and therefore the carrier frame basically rotates about itself. The processing tool can thereby be guided along a circular path, more specifically in particular if the processing tool is arranged in the carrier frame at a spacing from the axis of rotation. The circular path along which the processing tool is guided can deviate from the circular path along which the displacement means move. Preferably the circular path on which the displacement means travel surrounds the circular path along which the processing tool is guided, at a small spacing.

Advantageously the carrier frame is adjustable in length in order thereby to alter a spacing between at least two of the displacement means. That can provide that the displacement means can be displaced along circles of differing sizes and accordingly also the processing tool can be guided along different circular paths. The processing means can thereby be universally employed for pylon segments of differing sizes. For the production of pylon segments of a conically converging pylon which can thus vary in diameter with height, a single processing means may be sufficient, which is adapted to the corresponding dimensions by the variation in length of the carrier frame.

Preferably the processing means includes a measuring sensor adapted to a position sensor. Such a position sensor predetermines an exact position, in particular a vertical position, and thereby virtually defines an exact plane to which the surface to be processed is to be adapted. In particular that provides for plane-parallelism of the planar surface to be produced or processed of the respective pylon segment in relation to the support base surface of the same pylon segment. For processing a planar surface of the foundation, in particular a surface which is as horizontal as possible is to be provided in order to ensure that the concrete pylon to be erected is set up vertically as exactly as possible.

The measuring sensor is adapted to such a position sensor and thus the processing tool can be guided along the planar surface to be produced or processed, being established by the position sensor. In particular such a system comprising the position sensor and the measuring sensor operates optically, in particular by way of a laser. In that case, when processing an upper segment edge, the position sensor is oriented in relation to the support base surface, in particular on a processing tray on which the pylon segment to be produced or further processed stands during the processing procedure.

There is also proposed a method of producing or processing a planar surface of a processing tray and/or a concrete foundation. Such a processing tray is a processing support, in particular a steel plate, which has a planar surface. Placed on that planar surface for the production of a concrete segment are suitable shutterings, into which concrete is to be poured to produce the concrete segment in question. In that respect the orientation of the concrete segment is already vertical, that is to say as it will also be oriented in the concrete pylon to be produced. In that case the shutterings are appropriately open downwardly so that the concrete is cast directly on to the processing tray. The planar surface of the tray thus defines the underside of the concrete segment to be produced. In addition that means that the shutterings also stand perpendicularly on the processing tray. Accordingly a planar surface of high quality and in particular with good knowledge of the orientation of the processing tray is important. Similarly important is also a planar surface, which is as horizontal as possible, of a concrete foundation on which a concrete pylon is to be perpendicularly erected.

The method of producing a planar surface on the processing tray and/or the concrete foundation includes the steps of arranging a processing means on the planar surface to be processed or produced and displacement of the processing means along the planar surface and in that case processing or producing the planar surface. In that case the displacement means are arranged on a plane including the planar surface. The processing means is therefore placed directly on the surface of the processing tray or on the surface of the concrete foundation. The processing means in that case includes a processing tool for processing the planar surface, a carrier frame for carrying the processing tool and a plurality of displacement means for displacing the processing tool along the planar surface. In that case the processing tool is displaced in such a way that the carrier frame is displaced.

Preferably a processing means is used, which is designed in accordance with at least one of the above-described embodiments. That provides that a processing means can be used not only for different pylon segments but in addition also for processing the processing tray and the surface of the foundation. That can be achieved by a single processing means at least in accordance with an embodiment as described hereinbefore. It may only be desirable to adapt a suitable processing head to the specific task involved, in particular the specific material, that is to say to change the processing head for the respective operation of processing a pylon segment, the processing tray or the pylon foundation. The rest of the structure of the processing means however can remain the same. Planar or plane-parallel guidance of the processing tool can be effected by means of the same or a similar position sensor which is possibly to be adapted to the corresponding processing height.

Preferably the processing or production method is implemented in such a way that the carrier frame rotates about an axis of rotation and therefore in particular rotates about itself and in so doing guides the processing tool along a circular path. The planar surface in question can then be processed in the region of that circular path. Purely as a precaution it is noted that a particularly high degree of precision is required for the planar surface, in particular also a condition of plane-parallelism. Exactly following the specified circular path is more tolerant in relation to deviations, in particular if a generously wide region is processed planarly along the corresponding circular path or if there is provided a generously wide processing head. In that way for example when the pylon foundation is subjected to planar processing it is possible to dispense with a rail system or a single rail for guiding the displacement means and thus for guiding the processing means. Preferably however a rail or the like is also provided there. However, the position sensor in conjunction with the measuring sensor provides for planarity of the planar surface so that it is possible to achieve planarity with a high level of quality and/or accuracy.

According to another embodiment of the invention there is also proposed a method according to claim 14. In accordance therewith the processing means is guided, in particular displaced, along the segment edge to process the upper segment edge. In that case the processing means is guided by the carrier apparatus along the carrier apparatus and thus along the segment edge. In that respect the carrier apparatus is fixed in the region of the upper segment edge. In that case the segment edge is processed while the processing means is moved along the segment edge. Processing of the segment edge can include applying a resin or cement and planar processing of the segment edge. Preferably in that case a resin or cement is applied in the first step and the resin or cement is subjected to planar processing, in particular after hardening, in a second step, in particular by the resin or the cement being milled or ground off. In that respect it can be provided that different processing means are used for the two specified working procedures.

Preferably the processing means is operated by means of the measuring means in such a way that processing always takes place at the same height in relation to the support base surface of the pylon segment, in particular processing being at the height of a virtual measuring plane. Preferably the carrier apparatus is fixed to a shuttering of the pylon segment and the at least one processing means travels on that carrier apparatus along the segment edge.

Preferably a processing head of the or each processing means is altered in height in order thereby to preserve the height of the processing operation, even if the processing means is not guided on the carrier apparatus in the desired plane in the optimum fashion.

Preferably processing of the segment edge includes the application of a resin or cement as a compensating material and additionally or optionally planar processing of the segment edge, in particular of the compensating material applied to the segment.

In an embodiment it is proposed that the segment edge, namely the top side of the segment, is directly subjected to planar processing without a compensating material having been previously applied. Processing of the material of the segment, namely the concrete, from which the segment was made, is thus effected directly. The planar processing operation can be in particular in the form of grinding off the segment, that is to say grinding off the concrete. A processing tool suitable for that purpose is correspondingly used. For that purpose the segment can be made initially somewhat higher than hitherto, or somewhat higher than the height which it finally has when the pylon is constructed. For example the segment can be about 8 mm higher than previously, in which case then approximately or on average 4 mm is removed from that concrete in the processing operation, in particular being ground away. Those values can also be somewhat higher and somewhat lower. A compensating layer is no longer required.

It is desirable if a processing apparatus in accordance with at least one of the described embodiments is used.

It is further advantageous, when applying a quick-hardening resin or quick-hardening cement, to use in particular a two-component resin or cement. In that way it is possible to avoid a cement or resin used as the compensating material having to be initially applied in a closed passage and hardened. Instead the method according to an embodiment is such that a material-removing step, in particular involving milling away the hardened compensating material, is implemented as far as possible without any time delay after application of the compensating material, in particular the resin or cement.

The term quick-hardening resin or cement is used to mean a resin or cement which hardens within four hours, preferably within two hours, further preferably within one hour and in particular within half an hour, to such an extent that it can be processed and in particular post-processing, namely smoothing, can be envisaged, by means of a milling cutter.

According to another embodiment of the invention there is further proposed a shuttering according to claim 24. Such a shuttering for the production of a pylon segment in the form of a precast concrete part is provided for concrete to be poured into the shuttering to then harden as a pylon segment in the form of the precast concrete member. In that respect there is provided a processing apparatus, by which the carrier apparatus is fixed to the shuttering. In that way the shuttering is adapted to produce the precast concrete member by pouring of the concrete and for post-processing the upper segment edge for placing at least one further pylon segment thereon.

Preferably the shuttering has an inner and an outer shuttering portion and the carrier apparatus of the processing apparatus has a rail system with an inner and an outer rail. In this case the inner rail is fixed to the inner shuttering portion and the outer rail is fixed to the outer shuttering portion. The rail system and thus the carrier apparatus of the processing apparatus can thus be easily provided at the same time, with the provision of the shuttering, namely appropriately arranging the inner and outer shuttering portions relative to each other for pouring the concrete. Preferably the shuttering and in particular the outer shuttering portion is adapted to be displaceable.

There is further proposed a pylon segment of a pylon of a wind power installation according to claim 26. Such a pylon segment is produced by means of a processing apparatus, in accordance with one of the described embodiments. In addition or alternatively it is proposed that the pylon segment is produced with a method according to one embodiment of the invention. Further preferably, it is additionally or alternatively proposed that the pylon segment is produced by means of a shuttering according to one embodiment of the invention. In that respect it is proposed that a described processing apparatus is used for production and thus final processing of the upper segment edge of the pylon segment. The processing apparatus is distinguished inter alia by the processing means being guided on a carrier apparatus along the upper segment edge.

The processing operation carried out in that way can be recognized or demonstrated at the upper segment edge on a pylon segment which has been subjected to finishing processing. That can be seen from the milling pattern for example if the processing means subjected the upper segment edge to a planar milling operation, in particular if the milling pattern reveals guidance of the processing means. The use of a quick-hardening resin or cement can be established by analysis of the material used for the upper segment edge. Possibly, it can be seen at the transition of the compensating material to the concrete that no receiving passage was used for provision of the compensating material, but rather application of the compensating material was effected by a compensating element which was guided along the upper segment edge.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Hereinafter the same references can be used for similar but not identical elements to clearly illustrate their functional relationship.

FIG. 1 shows a wind power installation 100 comprising a pylon 102 and a pod 104. Arranged at the pod 104 is a rotor 106 having three rotor blades 108 and a spinner 110. In operation the rotor 106 is caused to rotate by the wind and thereby drives a generator in the pod 104.

Figure 2:
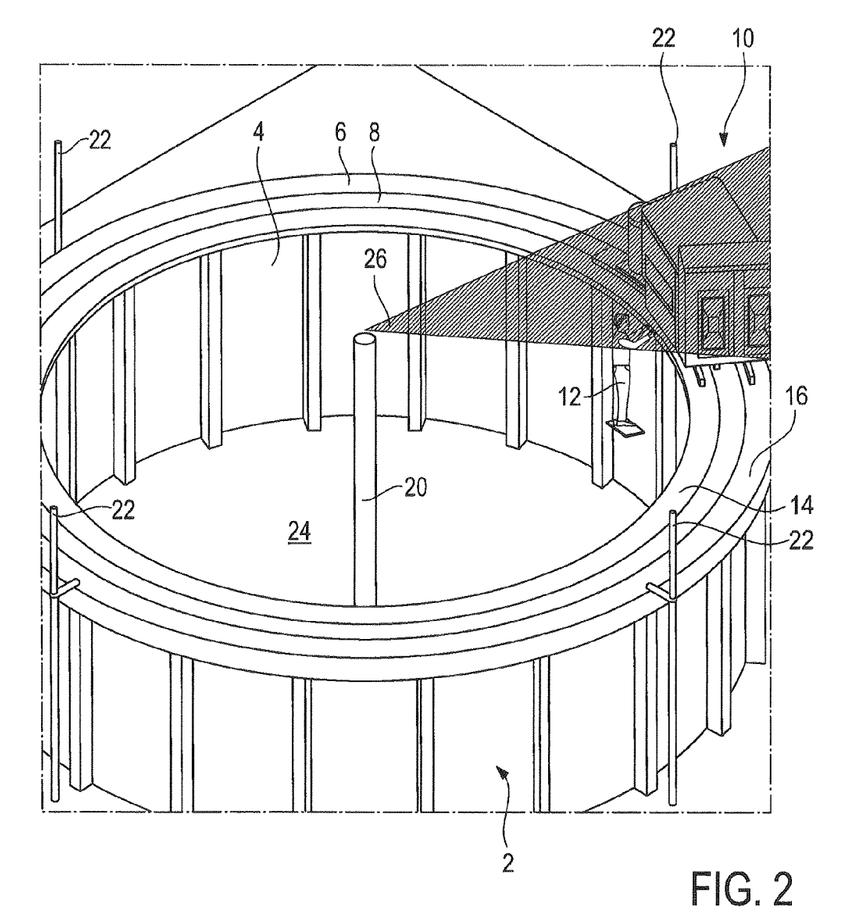
FIG. 2 shows a diagrammatic perspective view of an overall structure of a shuttering with processing apparatus and measuring system.

FIG. 2 diagrammatically shows a shuttering 2 comprising an inner shuttering portion 4 and an outer shuttering portion 6. Formed between the inner and outer shuttering portions 4, 6 is an annular gap, into which concrete is poured to produce a pylon segment. Of such a pylon segment, FIG. 2 only shows its upper segment edge 8. FIG. 2 shows the condition in which the pylon segment has already been cast and the concrete has hardened. Post-processing of the upper segment edge 8 can now be effected, the processing means 10 being diagrammatically shown for that purpose. The processing means 10 is displaceable on a rail system having two rails of which one is arranged on the inner shuttering portion 4 and another on the outer shuttering portion 6, the rail not being shown in the simplified view in FIG. 2. The rail system together with the processing means 10 is to be referred to as the processing apparatus for processing the upper segment edge 8, wherein further elements can be part of the processing apparatus.

A person 12 is shown in the proximity of the processing means 10, to illustrate the dimensional relationships.

The processing means 10 is guided along the upper segment edge 8 and thus along the upper edges 14 and 16 respectively of the inner and outer shuttering portions 4, 6. To measure and control the processing means 10 there is provided a measuring system which as shown in FIG. 2 includes a position sensor 20 and four orientation means 22. The position sensor 20 is arranged on a support base surface 24 and in the center in the shuttering 2. The four orientation means 22, which may be posts as shown in FIG. 2, are arranged and fixed from the exterior to the shuttering 2, namely to the outer shuttering portion 6—which is made up from at least two elements which can be fitted together. The position sensor 20 emits a laser 26 in the direction towards the processing means 10. That laser 26 which is emitted in a plurality of directions thereby defines a virtual measuring plane which is in plane-parallel relationship with the surface 24. Basically that virtual measuring plane is defined by the four orientation means 22. The position sensor 20 can be oriented by means of those four orientation means 22 so that the emitted laser 26 actually precisely reproduces the virtual measuring plane which is accordingly formed precisely in plane-parallel relationship with the surface 24.

Figure 3:
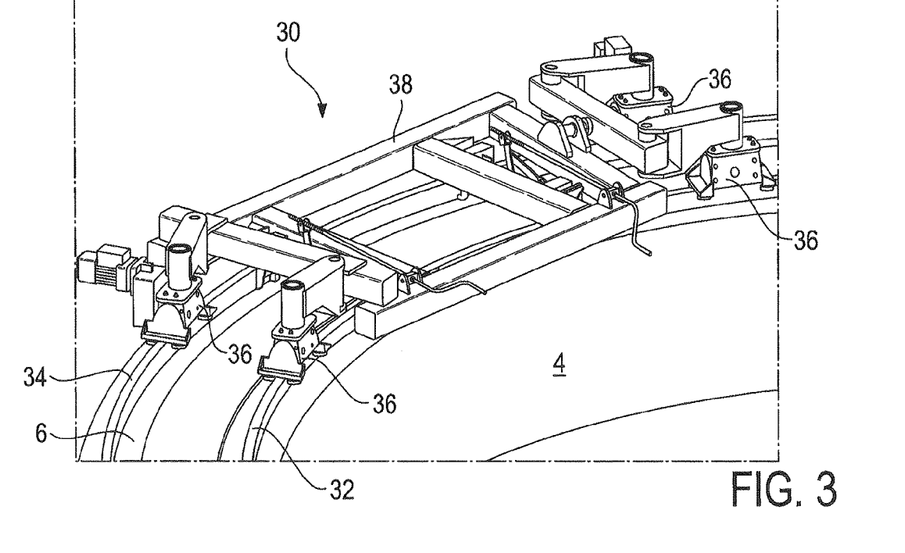
FIG. 3 shows a perspective view of a travel apparatus of a processing apparatus.

FIG. 3 shows a travel apparatus 30 which is carried and guided on an inner and outer rail 32, 34. The inner and outer rails 32, 34 which together substantially form a rail system and thus a carrier apparatus are fixed on an inner and an outer shuttering portion 4, 6. The rails 32 and 34 and other portions making up the carrier apparatus are connected to the shuttering by any accepted technique structure, which may involve bolts, screws, clamps, nails with oversized heads and the like. The upper segment edge 8 can be seen between the inner and outer shuttering portions 4, 6. The travel apparatus has four rail guides 36, by means of which the travel apparatus 30 is movably carried and guided on the two rails 32, 34. The travel apparatus 30 can thus be guided and moved along the inner and outer rails and thus along the upper segment edge 8. In that case the travel apparatus 30 has a receiving space 38 for receiving a processing tool. In that way a processing tool accommodated in the receiving space 38 can be moved along the upper segment edge 8.

Figure 4:
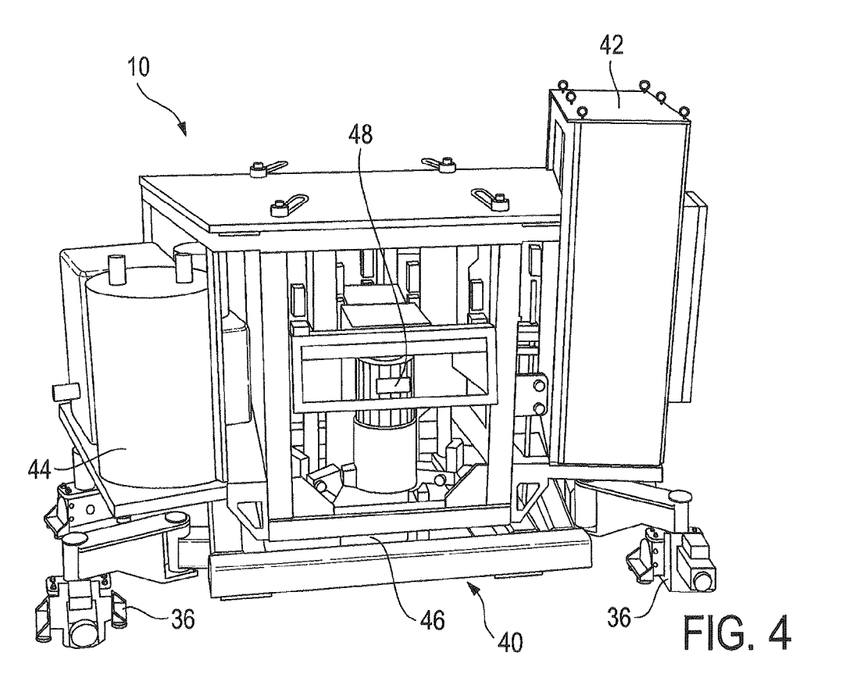
FIG. 4 shows a perspective view of a processing means with travel apparatus and processing tool in accordance with one embodiment.

FIG. 4 shows a travel apparatus 30 with a processing tool 40 accommodated in the receiving space 38, together with a control apparatus 42 with further functional units like a suction removal device 44. The processing tool 40 in FIG. 4 is in the form of a milling apparatus and accordingly has a milling head 46 and a detector 48.

FIG. 4 thus shows overall a processing means 10 adapted for planar milling of the upper segment edge. In this case the processing means 20 recognizes its position relative to the imaginary measuring plane and can adapt the milling head 46 in respect of height for compensation purposes so that the milling head 46 is always guided at the same height—relative to the virtual measuring plane or relative to the support base surface. In this case the processing means 10, in particular the control apparatus 42, is oriented to the virtual measuring plane, as is provided by a suitable laser from the position sensor of the measuring system for orientation purposes.

Figure 5:
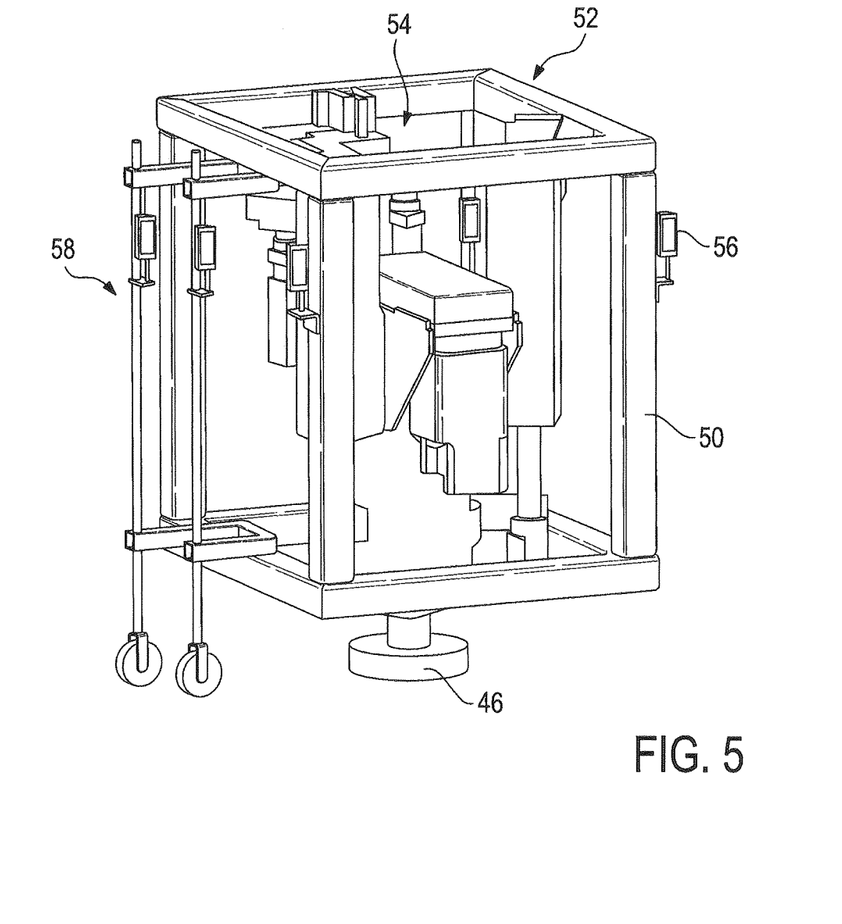
FIG. 5 shows a perspective view of a processing tool for milling.

FIG. 5 shows a part of the processing tool 40, namely in particular the milling apparatus 42 accommodated in a milling frame 50. The milling apparatus 52 includes a milling head monitoring means 54 which checks whether the milling head 46 is operating correctly. In addition there is a milling carriage monitoring means 56 which monitors the position of the milling apparatus 52 on the travel apparatus 30 (as shown in FIG. 4). The surface of the upper segment edge, namely in particular the milling result on the surface of the upper segment edge, can be monitored by means of a join surface monitoring means 58. In that way any unevenness which could be caused by trouble with the milling operation can be detected in order to detect defects in good time and/or to be able to initiate post-preparation operations.

Figure 6:
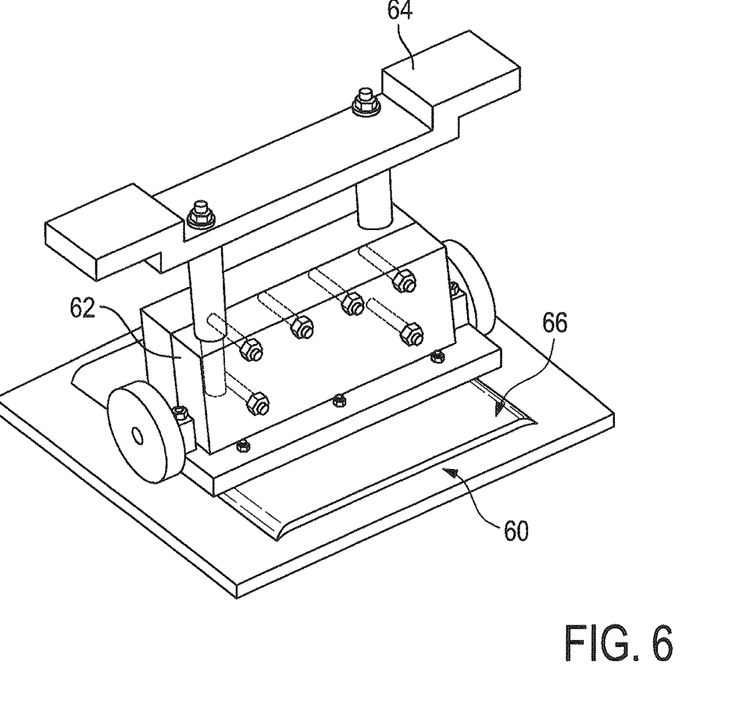
FIG. 6 shows a perspective view of a processing tool for applying a compensating material.

FIG. 6 shows a resin or cement applicator apparatus 60, as the processing tool. The resin or cement applicator apparatus 60 can also be received by a travel apparatus 30 (as shown in FIG. 3) and, provided with a suitable control means and supply line, can be used for processing the upper segment edge. The resin or cement applicator apparatus 60 has for that purpose substantially a wide slot nozzle 62, of which FIG. 6 shows essentially a housing, from the outside thereof. The slot nozzle 36 is held in use on a holder 64 and is guided in the travel apparatus 30. A discharge plate 66 which is intended to promote uniform application of resin or cement downwardly adjoins the slot nozzle.

Figure 7:
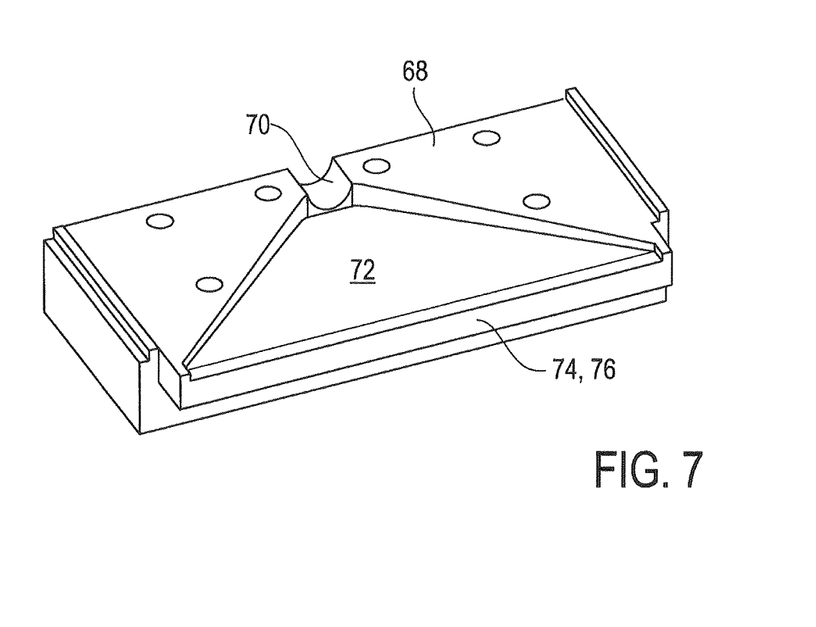
FIG. 7 shows a perspective view approximately of a part of the opened applicator nozzle of a processing tool as shown in FIG. 6.

FIG. 7 shows a part of the slot nozzle 62 in FIG. 6, namely a nozzle jaw 68. The nozzle jaw 68 shows a feed opening 70 for feeding the resin or cement to be applied, from which the resin or cement, after it has preferably been mixed up from two components, passes into the approximately triangular distribution region 72 in order then to pass to a narrow slot 74, of which the nozzle jaw 68 shows a corresponding discharge edge 76, in order there to issue from the nozzle.

Figure 8:
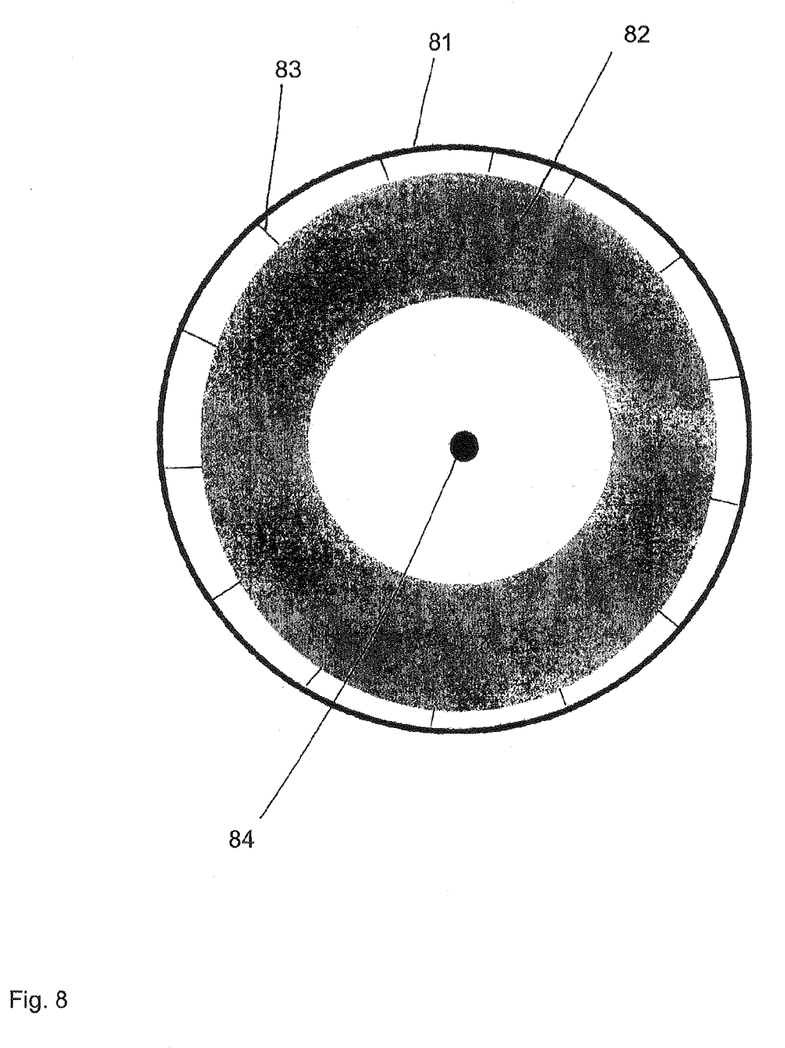
FIG. 8 shows a diagrammatic plan view of the precast concrete member with guide path.

FIG. 8 shows a plan view of a shuttering for a precast concrete member 82 with a guide system for a processing means 86, namely a displacement carriage 86. The guide system 81 which can also be referred to as the carrier apparatus can comprise a rail 81 or a guide of another kind. The rail 81 is connected to struts 83 on the shuttering 82 for the precast concrete member. Disposed in the center of the shuttering 82 is a position sensor 84 which can also be simply referred to as the laser 84 and which serves to orient the milling head 88 so that the latter can process the surface on the precast concrete member. The aim is to produce the surface of the precast concrete member in plane-parallel relationship, namely to produce a planar surface at the top side of the precast concrete member, which surface is in plane-parallel relationship with its underside or the side on which it stands, so that the precast concrete members can be mounted in mutually superposed relationship on the building site when erecting the concrete pylon, without in that case using cement or mortar as a compensating material.

Figure 9:
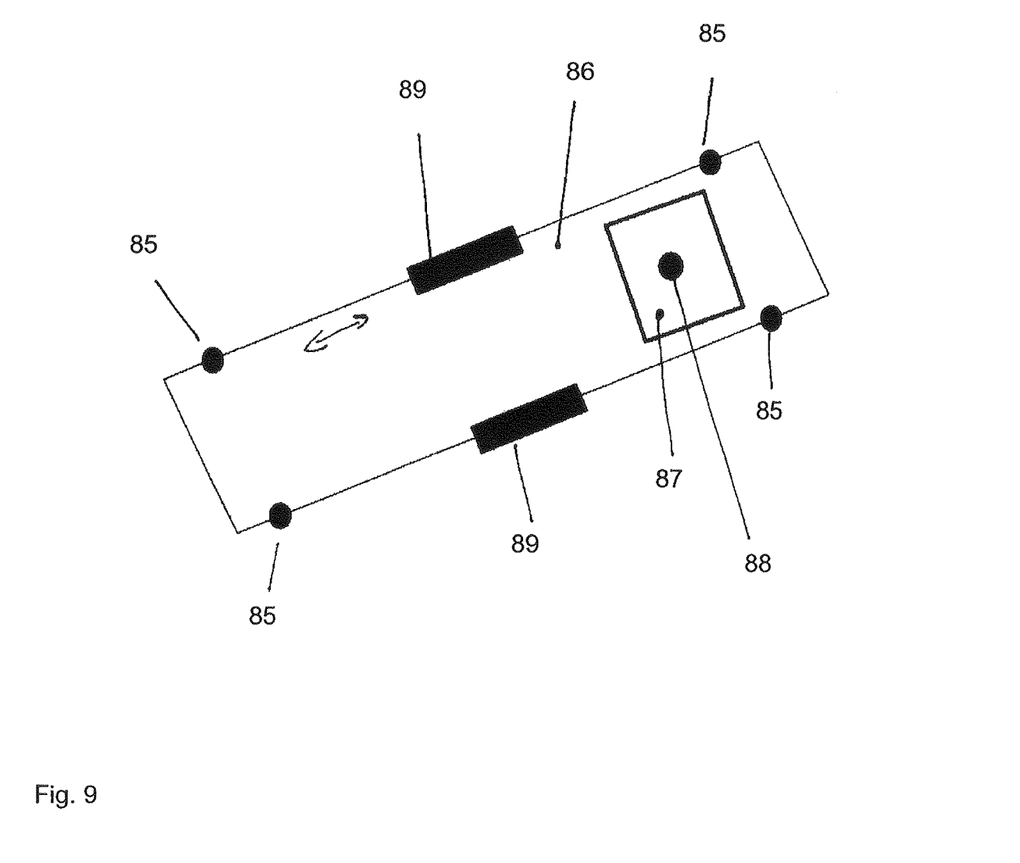
FIG. 9 shows a diagrammatic plan view of a processing means according to a further embodiment.

FIG. 9 shows the displacement carriage 86, namely a processing means for processing a planar surface. The carriage 86 is put on to the guide system 81, namely the illustrated rail 86 which extends approximately in a circular shape. Disposed on the displacement carriage 86 is a milling device 87 which for simplicity can also be referred to as the milling cutter 87. The milling cutter 87 in the illustrated embodiment thus forms a processing tool and alternatively for example can also be in the form of a grinding device. The milling device produces plane-parallelism on the precast concrete member, by milling away the surface of the precast concrete member, namely milling it flat. For that purpose the displacement carriage 86 is moved along the guide system 81 by rollers 85 or alternatively also by tires which represent a further example of the displacement means. The rollers 85 can be driven individually by way of one or more motors. A concrete pylon of a wind power installation comprises many different pylon segments, namely precast concrete segments which each require their own respective shuttering in the manufacture thereof. As the pylon extends in a conical configuration the diameters of the shutterings for the individual segments become progressively smaller, the higher the pylon segments are to be positioned in the concrete pylon. So that the displacement carriage 86 can adapt to the different shutterings, the displacement carriage 86 and in particular its carrier frame is adjusted in length by the adjustment devices 89. All necessary control devices for the milling head 88 and for control of the displacement carriage 86 are disposed on the processing tool, namely the milling cutter 87.

Figure 10:
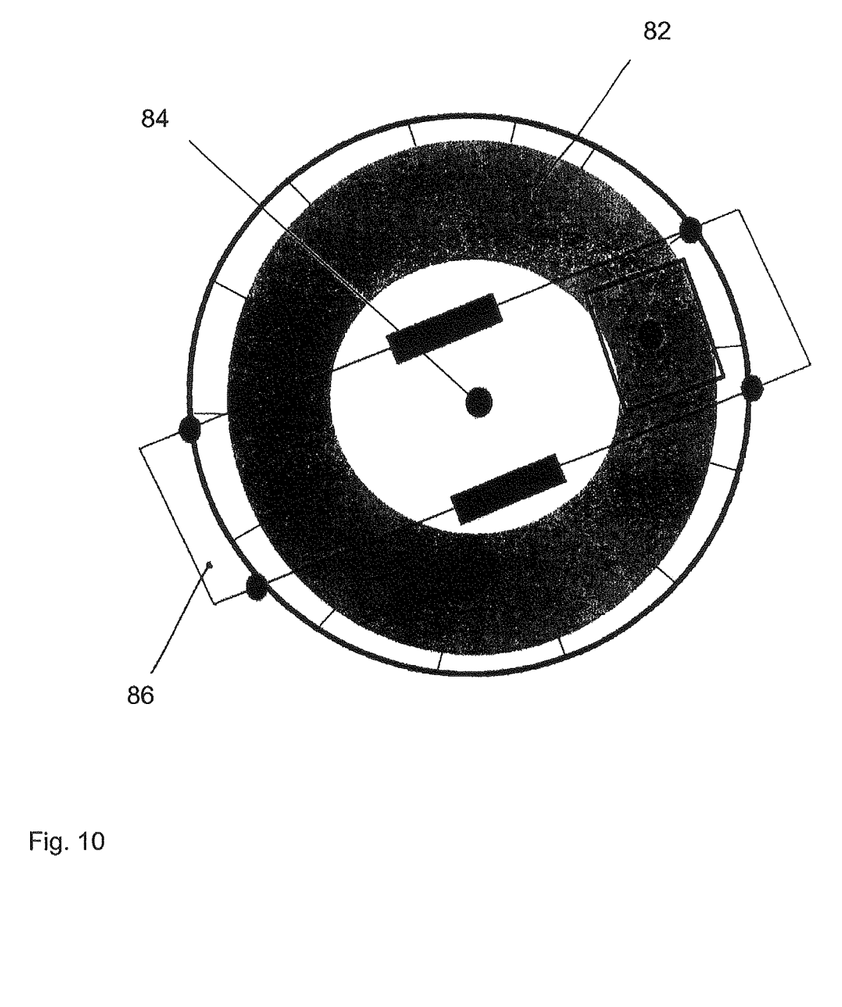
FIG. 10 shows a diagrammatic overall plan view of a precast concrete member as shown in FIG. 8 with a processing means as shown in FIG. 9.

FIG. 10 shows an overall view of the displacement carriage 86 arranged on the shuttering of the precast concrete member 82. Disposed at the center is a laser 84 which operates as a position sensor and which defines a guide plane for the displacement carriage. That plane is detected by the displacement carriage 86 by means of a measuring sensor and the position of the milling head 88 is appropriately adapted. Alternatively or additionally a plurality of lasers can also be externally mounted to the shuttering if the laser 84 is no longer detected and/or for orientation of the central laser 84, or if further measurement points are required for more accurately determining the position of the displacement carriage and/or the position sensor.

The use of the displacement carriage 86 is not just limited to the production of precast concrete members for pylons of wind power installations. It can alternatively also be used for plane-parallel or planar processing of foundation surfaces for wind power installations. Here, the term plane-parallel processing of the foundation surface is used to denote plane-parallelism of the foundation surface in relation to a horizontal flat plane. Foundations are required for a wind power installation so that they can transmit their load into the ground. When erecting the pylon, in the present case therefore the concrete pylon, of a wind power installation, the first segment of the pylon must be placed in a precisely horizontal condition on the foundation. For that purpose it is necessary for both the underside of the first pylon segment and also the surface of the foundation at the locations where the segment is installed to be plane-parallel or planar. To produce those flat surfaces on the foundation, it is possible to use the same arrangement as shown in FIG. 8, except with the difference that the guide system 81 is mounted not to a shuttering but on the foundation.

In addition the FIG. 10 apparatus can be used to process a steel or also a metal disc in plane-parallel fashion. Such a disc is used for example in the production of precast concrete members. The shuttering is placed on such a metal disc which is also referred to as a processing tray and has substantially a plane-parallel or planar surface. When casting the segment therefore the plane-parallelism or planarity of the underside of the segment is afforded by the disc or the processing tray while on the top side of the segment that is achieved by the milling member. The disc has to be reconditioned about once per year so that the plane-parallel condition is restored. That procedure is effected by the apparatus of FIG. 10.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processing apparatus comprising:
   a processing means configured to planarize an upper segment edge of a precast pylon segment of a concrete pylon, wherein planarizing includes both removing material and applying a compensation material; and
   a carrier apparatus fixed to an upper surface of a shuttering for forming the precast pylon segment, the carrier apparatus being proximate the upper segment edge and configured to displaceably carry and guide the processing means along the upper segment edge.

2. The processing apparatus according to claim 1 further comprising a measuring means for determining the position of the processing means in relation to a processing plane in plane-parallel relationship with the support base surface.

3. The process apparatus according to claim 2 wherein the measuring means includes:
   a position sensor for measuring and transmitting the position of the processing means, and a plurality of orienting means for orienting or for assisting in orienting the position sensor in relation to the support base surface.

4. The processing apparatus according to claim 2 wherein the measuring means includes a laser that emits a light indicative of a desired height of the segment edge.

5. The processing apparatus according to claim 1 wherein the carrier apparatus is a rail system that includes a pair of rails.

6. The processing apparatus according to claim 1 wherein the processing means is at least one of the following:
   a displaceable material applicator for applying the compensating material;
   a milling apparatus;
   a grinding apparatus; and
   a travel apparatus for displacement along the carrier apparatus, wherein the travel apparatus is adapted to receive a processing tool.

7. The processing apparatus according to claim 1 wherein the processing means includes a working head that is movable in height.

8. A processing device comprising:
   a processing tool configured to produce a planar surface on an upper segment edge of a precast pylon segment of a concrete pylon, wherein the processing tool produces the planar surface by both removing material and adding a compensation material;
   a carrier apparatus fixed to an upper surface of a shuttering that was used to form the precast pylon segment;
   a carrier frame for carrying the processing tool; and
   a plurality of displacement rollers displacing the carrier frame along the carrier apparatus thereby displacing the processing tool along the planar surface.

9. The processing device according to claim 8 wherein the plurality the displacement rollers are adapted for displacement along a circular path, wherein the carrier frame spans the circular path, and the processing device is adapted so that the carrier frame rotates about an axis of rotation that extends through the carrier frame and thereby the processing tool is guided along a circular path to process the planar surface in the region of said circular path.

10. The processing device according to claim 8 wherein the carrier frame has an adjustable length in order thereby to alter a spacing between at least two of the displacement rollers.

11. The processing device according to claim 8 further including a measuring sensor coupled to a position sensor for guiding the processing tool along the planar surface.

12. A method comprising:
   fixing a carrier apparatus to an upper surface of a shuttering for forming a precast pylon segment of a concrete pylon;
   moving a processing tool along the carrier apparatus and along an upper segment edge of the precast pylon segment of the concrete pylon; and
   using the processing tool to both add a compensation material to the upper segment edge and to remove a material to thereby planarize the upper segment edge, wherein the processing tool adds and removes while the processing tool moves along the upper segment edge.

13. The method according to claim 12 wherein the processing tool is operated by a measuring means in such a way that processing the upper segment edge is effected at a same height with respect to a support base surface.

14. The method according to claim 13 wherein a processing head of the processing tool is varied in height to preserve a height of a desired processing operation.

15. The method according to claim 12 wherein the compensation material is a resin or cement.

16. The method according to claim 12 wherein the compensation material is a quick-hardening resin or cement.

17. A method comprising:
   fixing a carrier apparatus to an upper surface of a shuttering for forming a precast concrete pylon segment;
   coupling a processing device to the carrier apparatus proximate a surface of the precast concrete pylon segment, wherein the processing device includes:
      a processing tool for further planarizing the surface,
      a carrier apparatus fixed to the upper surface of the shuttering,
      a carrier frame for carrying the processing tool, and
      a plurality of displacement means for displacing the processing tool along the planar surface and along the carrier apparatus arranged, and
   using the carrier apparatus to displace the processing device along the surface, the processing device planarizing the surface, wherein planarizing includes both removing material and applying a compensation material to the upper segment edge, wherein the plurality of displacement means are arranged on the upper surface of the shuttering.

18. The method according to claim 17 wherein the processing tool is guided by an optical position sensor.

19. The method according to claim 17 wherein the carrier frame rotates about an axis of rotation that extends through the carrier frame and the processing tool is guided along a circular path to process the planar surface in the region of said circular path.

* * * * *